INVENTOR.
ORIN H. ALLMAN
BY W. A. SCHAICH &
E. J. HOLLER
ATTORNEYS

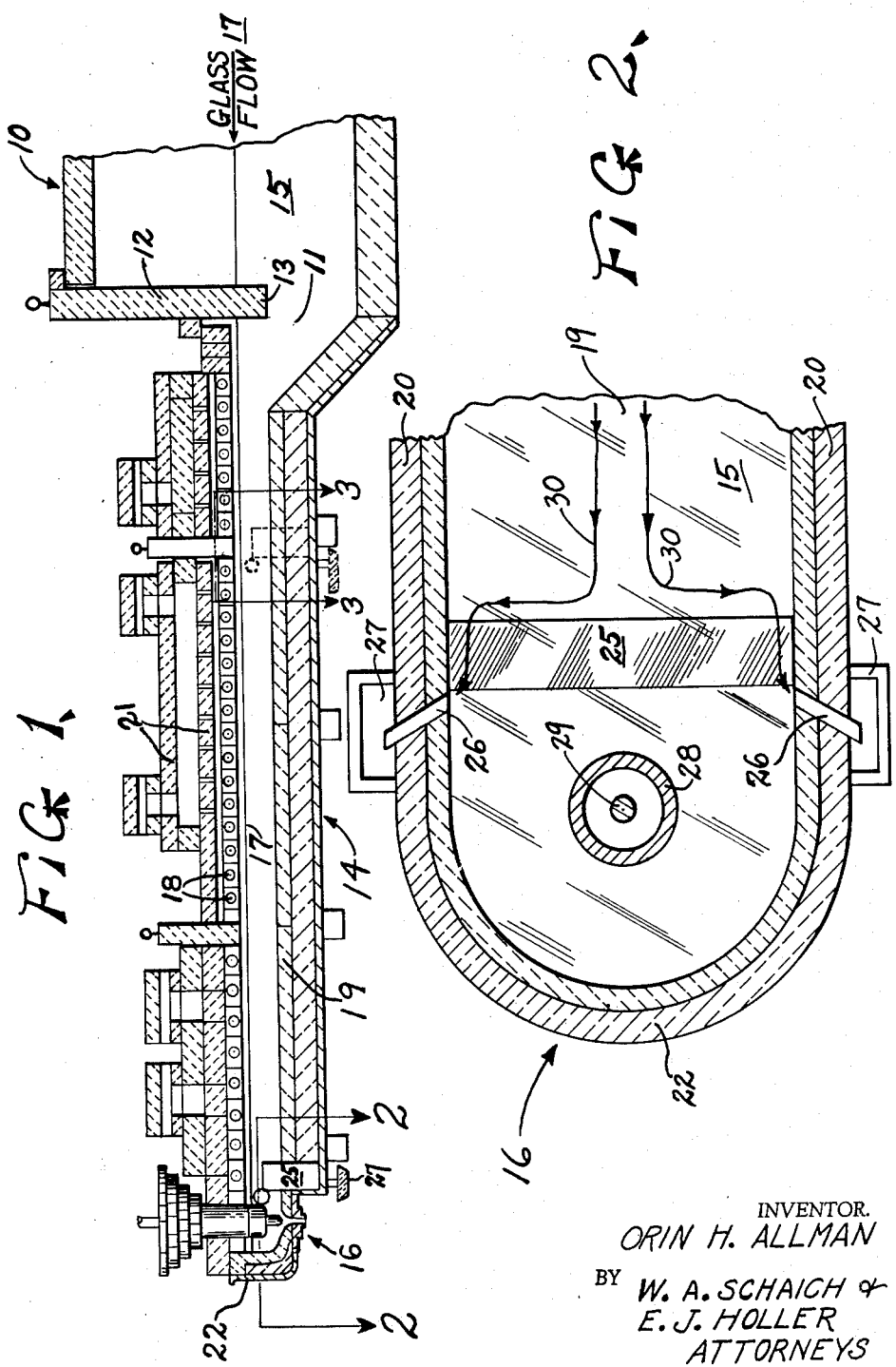
March 31, 1964 — O. H. ALLMAN — 3,127,262
METHOD AND APPARATUS FOR REFINING GLASS
Filed June 28, 1960 — 3 Sheets-Sheet 1
INVENTOR.
ORIN H. ALLMAN
BY W. A. SCHAICH &
E. J. HOLLER
ATTORNEYS March 31, 1964     O. H. ALLMAN     3,127,262
METHOD AND APPARATUS FOR REFINING GLASS
Filed June 28, 1960     3 Sheets-Sheet 2

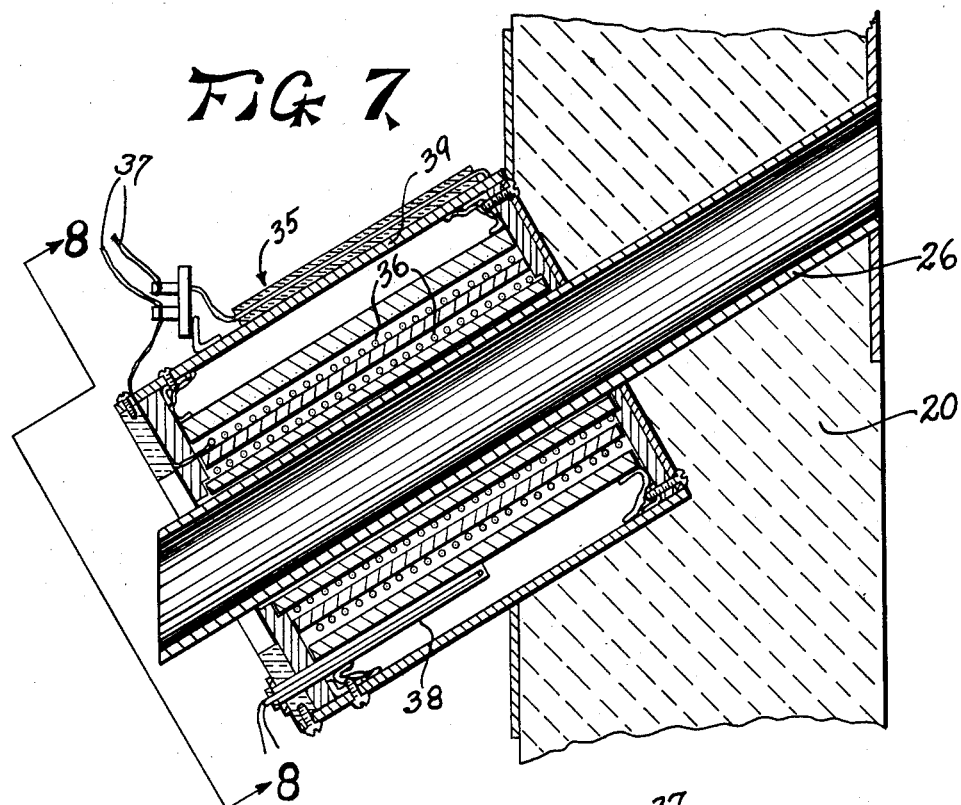
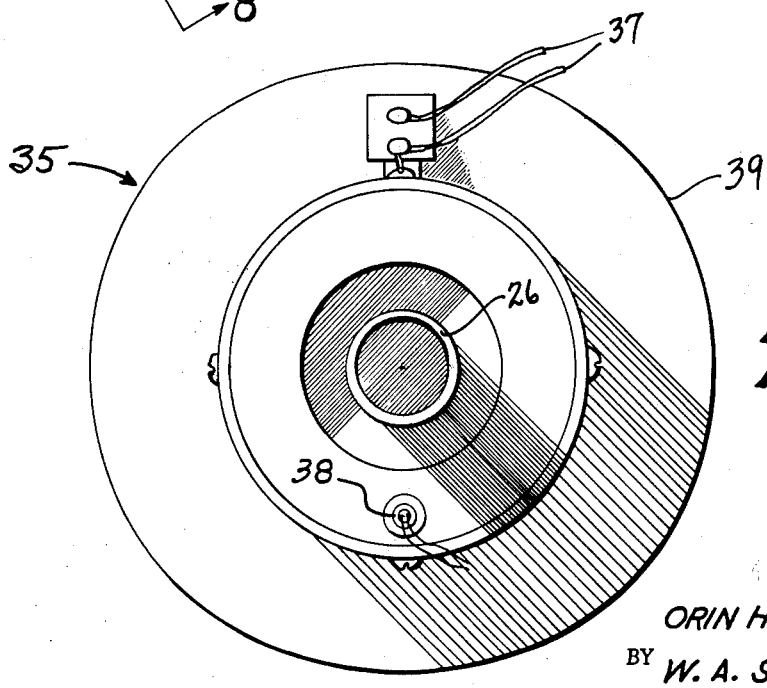

United States Patent Office 3,127,262
Patented Mar. 31, 1964

3,127,262
METHOD AND APPARATUS FOR
REFINING GLASS
Orin H. Allman, Toledo, Ohio, assignor, by mesne assignments, to Owens-Illinois Glass Company, Toledo, Ohio, a corporation of Ohio
Filed June 28, 1960, Ser. No. 39,394
7 Claims. (Cl. 65—134)

The present invention relates to improvements in glass furnaces and more particularly to methods and apparatus for refining molten glass during its continuous flow through a forehearth channel from a continuous tank furnace to supply glass forming machines.

In conventional installations for the manufacture of glass in continuous tanks glass-producing materials are melted in one end of a continuous tank furnace and the molten glass flows slowly through the refining portion of the furnace into a shallower receptacle or delivery forehearth at the delivery end of the furnace. The glass is conveyed horizontally through the forehearth to a point of use. The glass is continually heated and conditioned during its travel through the forehearth and the greater portion thereof which is conveyed consists essentially of surface flow. The lower stratum of the glass in the forehearth has slight movement and is relatively stagnant in comparison with the more fluid upper stratum. Thus, the upper surface portion of the glass which is highly heated is rendered very fluid compared with the relatively heavy viscous glass in the bottom and along the sidewalls of the forehearth. Due to such uneven heating some portions of the glass remain in the forehearth excessively long and due to the relative inactivity of the lower glass stratum the producing capacity of the tank is limited essentially to the volume of surface flow. The inactive glass in the forehearth bottom has a further defect in that substantially all impurities or contaimination such as stones, cords, striae and the like are formed and collect therewithin and periodically are carried into the main stream of glass which impurities and defects adversely affect the quality of glass drawn for fabrication.

During the conveyance of molten glass forwardly to the delivery orifice of a feeder through a refractory forehearth objectionable poor quality glass tends to collect along the forehearth bottom and adjacent its sidewalls as aforesaid and these impurities normally are scattered across its entire width. Should this relatively poor quality glass find its way into articles of optical quanlity such as cathode-ray television picture tube face plates fabricated by press molding, this glass causes visual defects such as cords, stones, blisters, smears or other defects in the viewing portion of the panel which are intolerable. Since the border portions of the molten glass within the forehearth adjacent the bottom and sidewalls do not flow as rapidly as the central portion thereof chiefly due to resistance to flow offered by such surfaces, the glass adjacent thereto is somewhat cooler due to dissipation of heat through the bottom and sidewalls. Since uniform temperatures frequently cannot be maintained through the width and depth of the molten glass within the forehearth over lengthy periods of time, heavy-density glass containing the aforementioned inhomogeneities tends to collect in the forehearth bottom and occasionally be drawn into the main stream of glass causing defects in the final articles. Such objectionable glass cannot be tolerated in producing high-quality glassware.

Accordingly, it is an object of this invention to eliminate the above stated objectable features in a forehearth whereby poor quality glass or that containing the principal impurities is separated from the better glass in such manner that only the very best quality glass is allowed to pass into the final articles produced which are then practically free from common glass defects such as cords, smears, seeds, blisters, stones, etc.

Another object of this invention is to avoid the inclusion of objectionable portions of molten glass by an improved conveying structure and method of conveying to effect concentration of undesirable portions of the glass to improve its quality and increase the quantity of glass passed therethrough.

Another object of this invention is to provide an improved method of refining glass.

Another object of this invention is to provide a forehearth structure which is particularly adapted to concentration and separation of objectionable heavy density glass from high quality glass during its conveyance through the forehearth.

A further object of the invention is the provision of method and means to eliminate the formation of stagnant objectionable glass which creates a drag on the edges or border portions of the main stream of glass being conveyed within a forehearth.

Other objects and advantages of the invention will become more apparent during the course of the following description when taken in connection with the accompanying sheets of drawings.

In the drawings forming a part of this application and wherein like numerals are employed to designate like parts throughout the same:

FIG. 1 is a longitudinal vertical sectional view of a furnace tank and forehearth with the latter embodying principles of the present invention, a portion of the tank being broken away.

FIG. 2 is an enlarged part sectional plan view of the outlet portion of the forehearth taken along the line 2—2 of FIG. 1.

FIG. 7 is a further enlarged vertical sectional view of one form of individual side drain taken along the line 7—7 of FIG. 4.

FIG. 8 is a side elevational view of an individual side drain taken along the line 8—8 of FIG. 7.

Figure 3:
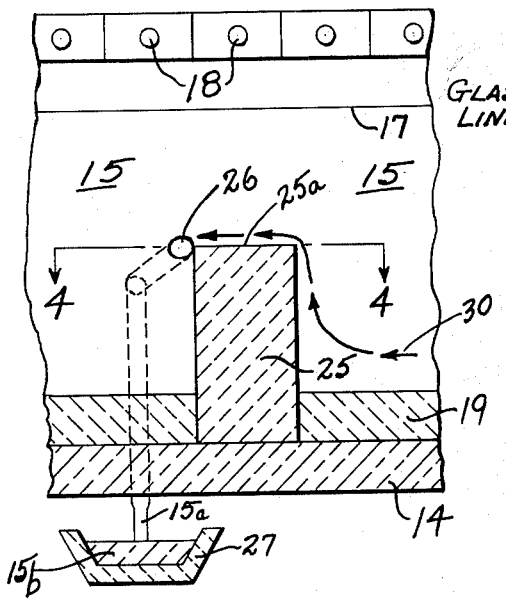
FIG. 3 is an enlarged fragmentary vertical sectional view taken along the line 3—3 of FIG. 1.

Referring to FIG. 1 the glass batch is melted and refined in a tank 10 and flows from the tank through an outlet 11 in the wall 12 of the tank and under a skimmer 13 into the forehearth 14. The glass 15 may be further refined and its temperature regulated in a conventional manner as the glass flows through the forehearth 14 to the feeder outlet 16. The glass level within the tank and forehearth is indicated by numeral 17 extending essentially horizontally throughout the tank and forehearth.

The forehearth has a series of burners 18 disposed in spaced-apart alignment adjacent the glass surface 17 in order to maintain the glass in proper fluid condition during its travel through the forehearth from melting tank to feeder outlet. The forehearth channel is comprised of elements such as bottom 19, sides 20 and roof 21. The foregoing elements of the forehearth are conventional in nature and may be fabricated of cast refractory materials.

The stated objects of this invention are obtained by effecting controlled flow of molten glass through the forehearth with the glass either being heated upon its upper surface only and/or through the side and bottom walls of the forehearth as by submerged electrodes whereby the entire body of conveyed glass is thoroughly heated and maintained fluid at the desired temperature and viscosity.

The stream of glass is of substantially the same viscosity upon entering the forehearth although as a practical matter some segregation and separation of the glass, into more fluid less dense upper, and less fluid more dense lower portions, tends to occur as the glass moves along through the forehearth comprised of cast refractory blocks.

A dam 25 is mounted in the forehearth at a position some distance forward from the point at which the glass enters the forehearth. The dam 25 comprises a refractory block which extends through the width of the forehearth between sidewalls 20 in fully submerged relation beneath the surface of the molten glass. The dam has a substantial height of essentially not less than one-half the depth of the glass to accelerate its flow thereover and to concentrate objectionable bottom portions of the glass near its extremities.

In a preferred form of the present invention dam 25 is disposed closely adjacent feeder outlet 16 and immediately upstream of the hemispherically contoured sidewalls 22 of the feeder outlet. A pair of side drains 26 extend through the sidewalls 20 of the forehearth immediately downstream of dam 25. Each drain 26 has its receiving end opening into the forehearth channel on the same horizontal plane as the crest of dam 25. Exteriorly of each side drain and immediately therebelow is positioned a container 27 for receiving the rejected objectionable portions of glass.

In the form of the invention shown in FIGS. 1 and 2 the dam and side drains 25 and 26 respectively are disposed closely adjacent rotary sleeve 28 and vertically reciprocatable plunger 29 disposed in alignment with the feeder orifice. The heavy-density glass portion disposed adjacent the channel bottom and sidewalls moves along the forehearth bottom considerably more slowly than the upper primary stream of high-quality glass. The lower portion which is known to contain considerably more cords, streaks, stones, blisters, etc. upon approaching the dam 25 is conveyed upwardly and divergently outwardly as indicated by lines 30 in FIG. 2. I have found that the dam of substantial height causes the bottom glass to be diverted outwardly and upwardly over its end regions. The objectionable bottom glass is thus concentrated closely adjacent the extremities of dam 25 as it passes thereover and into the receiving ends of the pair of side drains 26. By controlling the amount of glass withdrawn through the side drains, the quality of the main stream of glass as it enters the feeder outlet is markedly improved. This glass is essentially free from the aforesaid non-homogeneous types of defects such as can and do occur when all of the glass passes through the forehearth to the feeder orifice.

Figure 4:
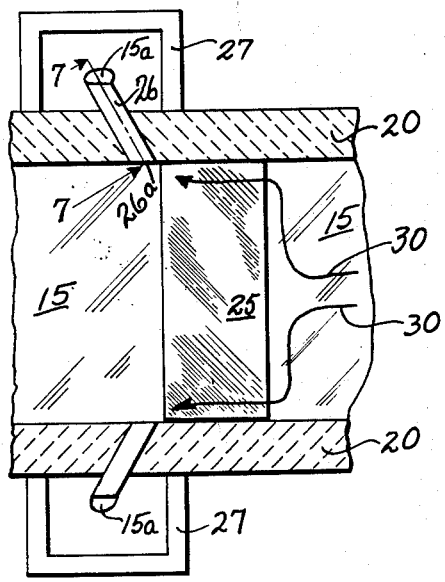
FIG. 4 is a fragmentary horizontal sectional view taken along the line 4—4 of FIG. 3.

In the form of the invention shown in FIGS. 3 and 4, dam 25 and side drains 26 similar to those shown in FIGS. 1 and 2 are disposed in an intermediate area of forehearth 14 as shown in broken lines in FIG. 1. Dam 25 has a height greater than one-half the depth of the glass so that the bottom portions of the conveyed glass pass up and over the dam crest 25a having an appreciably increased rate of flow. The receiving ends 26a of side drains 26 have their centers on a line essentially coplanar with the dam crest and extend outwardly and downwardly therefrom. The removed portion of glass 15a is drained into container 27 for disposal or reuse as cullet depending upon its quality.

In the form of the invention shown in FIGS. 3 and 4, the dam and pair of side drains 25 and 26 respectively are mounted within an intermediate area of the forehearth a considerable distance upstream from feeder outlet 16. The dam and side drains have essentially the same configuration and orientation as shown in FIGS. 1 and 2 with dam crest 25a and side drain openings 26a on essentially the same horizontal plane disposed in a medial region of the glass stream. The bottom glass similarly flows divergently outwardly and upwardly over the extremities of the dam and out through the side drains 26. Rejected glass portions 15a flow downwardly by gravity into collecting vessel 27.

Figure 5:
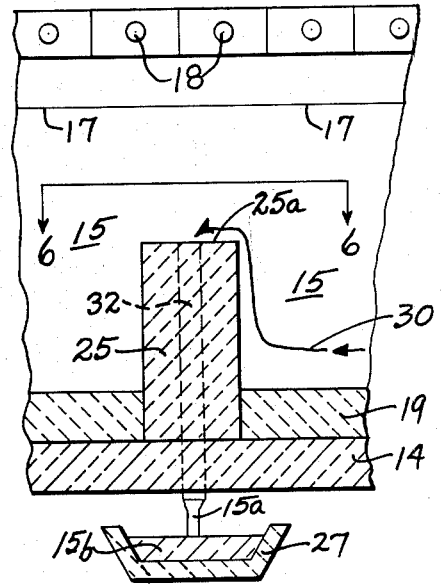
FIG. 5 is a view similar to FIG. 3 showing a modification of the invention.
Figure 6:
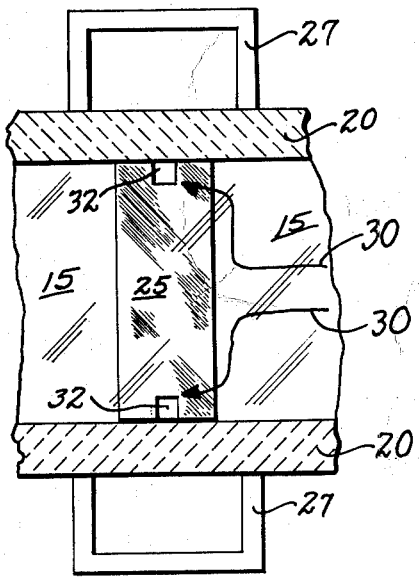
FIG. 6 is a view similar to FIG. 4 taken along the line 6—6 of FIG. 5.

In another form of the invention as shown in FIGS. 5 and 6 side drain openings 32 extend vertically through the extremities and interiorly of dam 25 and through the bottom of the forehearth 14. In this case the objectionable glass concentrated at the dam ends passes downwardly through dam 25 into collecting vessel 27 for either reuse or disposal.

It is preferred that each of the side drains 26 be comprised of a noble metal such as platinum, platinum alloy or the like and extend outwardly angularly both at an acute angle to the dam axis and downwardly from a horizontal plane. The outer major portion of each side drain and primarily its exterior portion is surrounded by a heater 35 of the resistance wire type. The heater consists of several cylindrical layers of windings 36 of resistance wire which are maintained in spaced relation. The ends of the resistance wire windings are connected to suitable contacts and electrical lead wires 37 of different polarity for supplying electrical energy to the heater. A thermocouple 38 is mounted within the heater adjacent the heating elements in order to observe or regulate the temperature interiorly of the side drain. The heating elements and thermocouple are enclosed within a suitable jacket 39 to prevent heat loss and obtain concentration of the heat along the axial length of the drain.

The combined dam and side drains serve to concentrate the striae of cold and cordy glass and a major portion of stones and blisters which are most prevalent along the forehearth bottom and adjacent its sidewalls. It is known in the hydraulics of glass flow in a forehearth channel horizontal flow can be controlled considerably better than vertical flow. By controlling the amount of glass removed through the side drains and properly conditioning the glass stream wide latitude of working limits of temperature and viscosity of the glass is possible. The amount of segregated flow through the side drains is regulated not only by the temperature of the glass within the forehearth but by the heaing coils which surround the exterior ends of the side drains.

The amount of glass which is removed through the side drains is dependent on the amount of cordy, streaked portions in the glass as evidenced by the ware produced. As more defects attributable to cords, streaks, blisters and stones, for example, are evident in the ware, more glass is removed through the side drains from the main body portion of glass. The removed glass may or may not be reused depending upon its particular characteristics.

It has been found that the dam should have a height at least one-half the depth of the glass in the forehearth. The lower the velocity of the glass stream passing the dam, the higher its submerged crown must be with respect to the overall glass depth, or alternatively, the more glass must be removed by the side drains to ensure the removal of objectionable bottom portions. The present invention has considerable value in melting and conveying all types of commercial glasses and is of particular value in further refining glasses for electronic use such as in press-forming face plate members of cathode-ray picture tubes. The invention is readily adapted to use in existing forehearths without extensive modifications thereto and the elements thereof have no moving parts requiring service and maintenance.

It has been found in a forehearth conveying a considerable tonnage of glass for pressing face plates of the order of about 70 tons per day, for example, that approximately two tons per day per drain are removed as a minimum to eliminate the objectionable glass.

The actual dam height is governed by the glass flow rate to the forming apparatus and the viscosity and density of the glass stream being conveyed as well as the width of channel and the segregated flow of objectionable glass through the side drains. As stated previously, the minimum dam height is in excess of one-half the fluid height and the side drains are mounted on the down stream edge of the dam sloping outwardly and downwardly for easy drainage or interiorly of the dam.

The undesirable glass as it approaches the dam flows toward the side walls of the channel and passes over the dam at its extreme edges and is removed by the side drains. Also any foam clinging to the sides of the channel or adjacent the surface of the glass is removed by the side drains. The remaining glass proceeds to the outlet orifice.

Various modifications may be resorted to within the spirit and scope of the appended claims.

I claim:

1. The method of refining molten glass during its conveyance to a point of use comprising the steps of flowing a stream of molten glass through a conveying channel, maintaining the molten glass at an elevated working temperature throughout its flow through said channel, effecting upward movement of the entire molten stream at one localized region, causing the heavy-density portion of said stream disposed within the lowermost region of said channel to flow upwardly and divergently outwardly through a vertical elevation at least one-half the depth of said stream, separating the said upwardly and outwardly directed heavy-density portion of said stream adjacent the sides of said channel and conveying same exteriorly of said channel.

2. The method in accordance with claim 1 including the step of separating the concentrated heavy-density portion of the glass stream through a pair of relatively narrow passages projecting through opposing sides of said channel and opening thereinto on substantially the same horizontal level to which the heavy-density glass is vertically elevated.

3. The method of refining molten glass to remove heavy-density cordy and non-homogeneous glass therefrom during its conveyance to a point of use comprising the steps of continuously flowing a stream of molten glass through an essentially enclosed refractory forehearth, maintaining the molten glass at an elevated working temperature throughout its passage through said forehearth, flowing the entire glass stream upwardly in a localized intermediate region so that the heavy-density portion thereof is caused to flow upwardly and outwardly toward the outer extremities of said region, separating the heavy-density portion of said stream adjacent the extremities of said region and conveying the objectionable heavy-density portion exteriorly of said forehearth through a pair of narrow passages while controlling the temperature thereof.

4. In combination with a glass melting and refining tank, a forehearth extending horizontally forward therefrom and providing a channel through which molten glass from the melting and refining tank flows continuously forwardly to a delivery orifice, means adapted to heating the glass within said channel to maintain the same at an elevated working temperature, the improvement wherein said channel has a submerged dam of substantial height at an intermediate region thereof adapted to accelerate the flow of the entire glass stream upwardly thereover and to effect upward and outward movement of the denser portion adjacent the channel bottom, and means adapted to segregate at least a major portion of the upwardly and outwardly directed denser portion during said accelerated and elevated flow, said segregating means being disposed in close proximity to said submerged dam.

5. A forehearth for conveying and refining molten glass comprising a refractory channel having bottom and side walls for retaining and conducting the molten glass to a point of use, heating means for controlling the temperature of molten glass within said forehearth, at least one refractory dam mounted within an intermediate area of said forehearth in fully submerged transverse relation, said dam having a substantial height adapted to divert upwardly and outwardly objectionable bottom glass and provide accelerated flow of the entire stream thereover, and a pair of narrow passages having receiving openings disposed in close proximity to the outer extremities of said dam for separating said objectionable bottom glass from the main stream of said molten glass.

6. The forehearth in accordance with claim 5, wherein the said pair of narrow passages consists of side drains projecting angularly through the channel sidewalls and disposed in opposing relation with their receiving openings on substantially the same horizontal plane as the crest of said dam.

7. The forehearth in accordance with claim 5, including heating elements surrounding each of said narrow passages to regulate flow of said objectionable bottom glass therethrough.

References Cited in the file of this patent

UNITED STATES PATENTS

| | | |
|---|---|---|
| 1,596,058 | Mambourg | Aug. 17, 1926 |
| 1,751,045 | Mambourg | Mar. 18, 1930 |
| 1,818,203 | Drake | Aug. 11, 1931 |
| 1,872,477 | Mambourg | Aug. 16, 1932 |
| 2,050,211 | Honiss | Aug. 4, 1936 |
| 2,203,269 | Mulholland | June 4, 1940 |
| 2,900,764 | Long | Aug. 25, 1959 |

FOREIGN PATENTS

| | | |
|---|---|---|
| 750,677 | Great Britain | June 20, 1956 |

OTHER REFERENCES

"Modern Glass Practice," Scholes, publ. by Industrial Publications, Inc., Chicago, 1946, pp. 116, 117.